(12) United States Patent
Abisaad

(10) Patent No.: US 11,947,129 B1
(45) Date of Patent: Apr. 2, 2024

(54) KALEIDOSCOPIC DEVICE

(71) Applicant: Ana Abisaad, Ft. Lauderdale, FL (US)

(72) Inventor: Ana Abisaad, Ft. Lauderdale, FL (US)

(73) Assignee: Ana Abisaad

( * ) Notice: Subject to any disclaimer, the term of this patent is extended or adjusted under 35 U.S.C. 154(b) by 247 days.

(21) Appl. No.: 17/649,248

(22) Filed: Jan. 28, 2022

(51) Int. Cl.
*G02B 27/08* (2006.01)
*G02B 25/00* (2006.01)

(52) U.S. Cl.
CPC ............ *G02B 27/08* (2013.01); *G02B 25/001* (2013.01)

(58) Field of Classification Search
CPC ...................................... G02B 27/08
See application file for complete search history.

(56) References Cited

U.S. PATENT DOCUMENTS

| | | | | |
|---|---|---|---|---|
| 1,577,388 | A | * | 3/1926 | Twyman ................. G02B 27/08 353/1 |
| 4,077,706 | A | * | 3/1978 | Yaeger .................... G03B 21/00 353/1 |
| 4,172,629 | A | | 10/1979 | Allen |
| 5,469,297 | A | | 11/1995 | Marshall et al. |
| 6,644,819 | B2 | | 11/2003 | Nelson |
| 8,157,392 | B2 | | 4/2012 | Larreta |
| 8,951,133 | B2 | | 2/2015 | Leach |
| 9,599,826 | B2 | | 3/2017 | Bonsack |
| 2012/0200828 | A1 | | 8/2012 | Chien |

FOREIGN PATENT DOCUMENTS

| | | | | |
|---|---|---|---|---|
| JP | | 3156824 U | * | 1/2010 |
| JP | | 3163341 U | * | 10/2010 |

* cited by examiner

*Primary Examiner* — Leon W Rhodes, Jr.
(74) *Attorney, Agent, or Firm* — Dunlap Bennett & Ludwig PLLC

(57) ABSTRACT

An optical instrument for modifying light as a function of selected prisms and anti prisms for generating visible complex geometries. The optical instrument provides a linear arrangement of crystal portions followed by prism portions through which light passes, respectively, before being viewable through an eyepiece. The crystal portions provides a multifaceted crystal prism, a crystal chamber housing a selective arrangement of a plurality of basic crystal polyhedra, and a rotatable transparent sphere. The prism portions provide mirrored and glass surface triangular prisms independently rotatable relative to the longitudinal axis of the optical instrument.

15 Claims, 4 Drawing Sheets

KALEIDOSCOPIC DEVICE

BACKGROUND OF THE INVENTION

The present invention relates to kaleidoscope devices and, more particularly, an optical instrument adapted to create complex geometric visuals that can be used for the textile, entertainment, art, and related industries.

In geometry, the two infinite families of prisms and anti-prisms include unlimited sets of finite groups, of which the most essential are the five Platonic solids, followed by thirteen Archimedean solids, two Kepler stellated polyhedra, and their respective rectification and dual a regular nonconvex polyhedra, as well as multifaceted crystal prisms.

Currently, complex geometries (which entail overlapping infrastructural patterns of form, where later ones are emerging out of a preceding pattern of form) are obtained exclusively by computer science, as their manner of construction can describe and generate visuals through the application of mathematical formulas. In certain endeavors visualization of new form and complex shapes would be a boon, such as textile, entertainment, art, and related industries. Currently, practitioners in these endeavors or fields may use a kaleidoscope to see complex geometrical patterns, but kaleidoscopes only show a small portion of the spectrum or range of complex geometries and lack selective control of the shapes that do emerge. Kaleidoscopes typically do not let users choose or select the basic shapes from which more complex are derived from. As a result, the kaleidoscope limits the user's "visibility" to see shapes and patterns which may beneficial and inspire textile prints, graphics etc.

As can be seen, there is a need for an optical instrument that redefines and escalates the planes of Euclidian and non-Euclidian geometry as well as reveals the substance that is concealed from our sensory perception. The present invention facilitates an approach to geometry as a contemplative practice, adapted to recreate images that will be used in the textile, entertainment, art, pedagogy, and other fields.

The optical instrument contemplated in the disclosure is intended for the observer to get involved in the process of creating the structural patterns emerging from the interposition of layered prism and anti-prism filters and metamorphosis of the electromagnetic waves traveling through those filters and other transmissive optical devices adapted to disperse light beams or other collimated beams.

In certain embodiments, light enters the optical instrument through a multifaceted crystal prism that sits at the base of the scope, modifies in a harmonic order the incoming flow of energy harmonizing the projections into a whole. Through the selection of one or more geometric polyhedra belonging to the Platonic solids, Archimedean solids, Kepler stellated polyhedra or a semi regular nonconvex polyhedra placed within, these solids will carry the information of the seed formula, that is implicit and establishes the patterns that will construct the composition of patterns at various scales. The geometric solids can be relatively easy to select and identify, due to their number of faces and number of vertices. These volumes will define, the resulting emerging limitless, formless visuals obtained.

The optical instrument enables a user to selectively choose among a plurality of geometric solids, furthermore, these basic shapes or geometric solids—the kernel from which the visibly complex shapes eventually blossom; in effect, inserting of the root seed of the formula, which generates the repeating patterns that propagate and multiply innumerably into the resulting complex geometries that are revealed to the user. Specifically, the user can choose the geometric solids that are inserted into the crystal chamber, which are then layered by the optics obtained by the particular qualities that each geometric solid refracts at its own particular angle, and these angles are what define the patterns in sequence. Again, these can be selected, alternated, specified, and modified, resulting in luminous geometric visualizations much more complex than a kaleidoscope.

The optical instrument embodied by the present invention provides a lens, a crystal portion, a prism portion and an eyepiece, in series respectively. The prism portion is tubular and provides a triangular glass prism and a triangular mirror prism in longitudinal series, wherein the glass prism is just distal of its eyepiece. Between the lens and the prisms, is the crystal portion of the optical instrument. The crystal portion, in longitudinal series, provides a centrally disposed multifaceted crystal prism, a crystal chamber (selectively housing one or more crystal basic geometric solids), and a crystal sphere, respectively. The novel arrangement, through which light passes and generates complex geometries by interacting first with the multifaceted crystal prism, then the one or more basic crystal geometries (housed in the crystal chamber), and finally the rotatable crystal sphere before which the light outputting therefrom enters the prism portion, thereby continuously rendering new forms. The mirror prism and the crystal prism are equal in perimeter but have negative and positive perpendicular areas creating a balance of the refracting and reflecting qualities, that take effect in the fabrication of the visuals, wherein the speed of light beams coming through the frontal lens is interrupted by the effects of all the overlapping crystals, and then multiplied and reduced by the mirror prism, and divided and enlarged by the crystal prism, therefore making the underlying patterns that construct reality visible to the human eye. This increased awareness of the resulting complex geometry, which not only is a universal language but also spurs creativity in the fields of art, architecture, textile, graphic, entertainment, psychology, philosophy, science, and the like.

The optical instrument embodied in the present invention demonstrates the genesis of new geometry otherwise generated only through mathematical formulas rendered by computers. Put another way, where a kaleidoscope allows us to see a greater but still limited portion of the spectrum of potential complex shapes, the present invention, colloquially known as the "EtherealScope", continually produces a fuller spectrum of represented complex linear and nonlinear geometric patterns.

SUMMARY OF THE INVENTIONS

In one aspect of the present invention, an optical instrument providing the following: a light path defined sequentially by a crystal portion and a prism portion; the crystal portion providing a crystal chamber dimensioned and configured to selectively and removably house one or more of a plurality of basic geometric solids; and a transparent sphere, wherein the crystal chamber is upstream of the light path relative to the transparent sphere.

In another aspect of the present invention, the above optical instrument, wherein the plurality of basic geometric solids is selected from the group consisting of Archimedean solids and Platonic solids.

In yet another aspect of the present invention, said optical instrument, wherein the transparent spheroid includes a cutout or a protrusion; and further comprising a multifaceted crystal prism upstream of the crystal chamber, wherein the multifaceted crystal prism upstream has a diameter of approximately thirteen centimeters, wherein the prism portion includes an interior mirror surface prism and an interior glass prisms with symmetrical triangles each conformed of 2 equilateral degree triangles 2.5 cm (1") high and approximately 15 cm long (6'), wherein the interior mirror and glass surfaces are rotatable relative to a longitudinal axis of the prism portion; a rotatable link operatively associated to each of the interior mirror and glass surfaces; and a lens upstream of the crystal portion; and an eyepiece downstream of the prism portion.

In another aspect of the present invention, the optical instrument includes a light path defined sequentially by a crystal portion and a prism portion; the crystal portion having: a crystal chamber dimensioned and configured to selectively and removably house one or more of a plurality of crystal geometries; and a transparent sphere disposed downstream of the light path relative to the crystal chamber above, wherein the plurality of crystal geometries is selected from the group consisting of five Platonic solids, thirteen Archimedean solids, two Kepler stellated polyhedra and a semi regular non-convex polyhedron, wherein the transparent sphere has a planar surface along a portion thereof, wherein the transparent sphere includes an irregular protrusion, wherein the transparent sphere includes a rough-cut resin surface; and having a multifaceted crystal prism upstream of the crystal chamber, wherein the multifaceted crystal prism upstream has a diameter of approximately thirteen centimeters, wherein the prism portion comprises: an interior mirror surface triangular prism; and an interior glass surface triangular prism, wherein the interior mirror and glass surface triangular prisms are independently rotatable relative to a longitudinal axis of the prism portion, and further having a rotatable link operatively associated to each of the interior mirror and glass surface prisms; and a lens upstream of the crystal portion; and an eyepiece downstream of the prism portion, wherein the transparent sphere is rotatable relative to a longitudinal axis of the prism portion, wherein the plurality of crystal geometries is optically transmissive, and wherein one or more of the plurality of crystal geometries are reflective.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, the disclosure provides an optical instrument as a function of selected principal polyhedra geometric solids, generating visible complex interconnecting geometric patterns that were heretofore invisible without the use of special lenses or unable to be demonstrated through mathematical formulas with the use of computer generators. The optical instrument provides a longitudinal arrangement of crystal portions followed by prism portions through which light passes, and multiplies respectively, before being viewable through an eyepiece. The crystal portions provides a multifaceted prism, a crystal chamber housing a selective arrangement of a plurality of basic crystal geometries, and a transparent sphere. The prism portions provide mirrored and glass surface triangular prisms, presenting opposite qualities of negative and positive areas of symmetrical prisms of equal perimeter polarizing the effects of the opposing objects and balances with harmonic order of polychromatic light waves and the interference of diffraction, refraction and reflection in relation to the polar surfaces which rotate on their respective links perpendicular to the longitudinal axis of the optical instrument.

Figure 1:
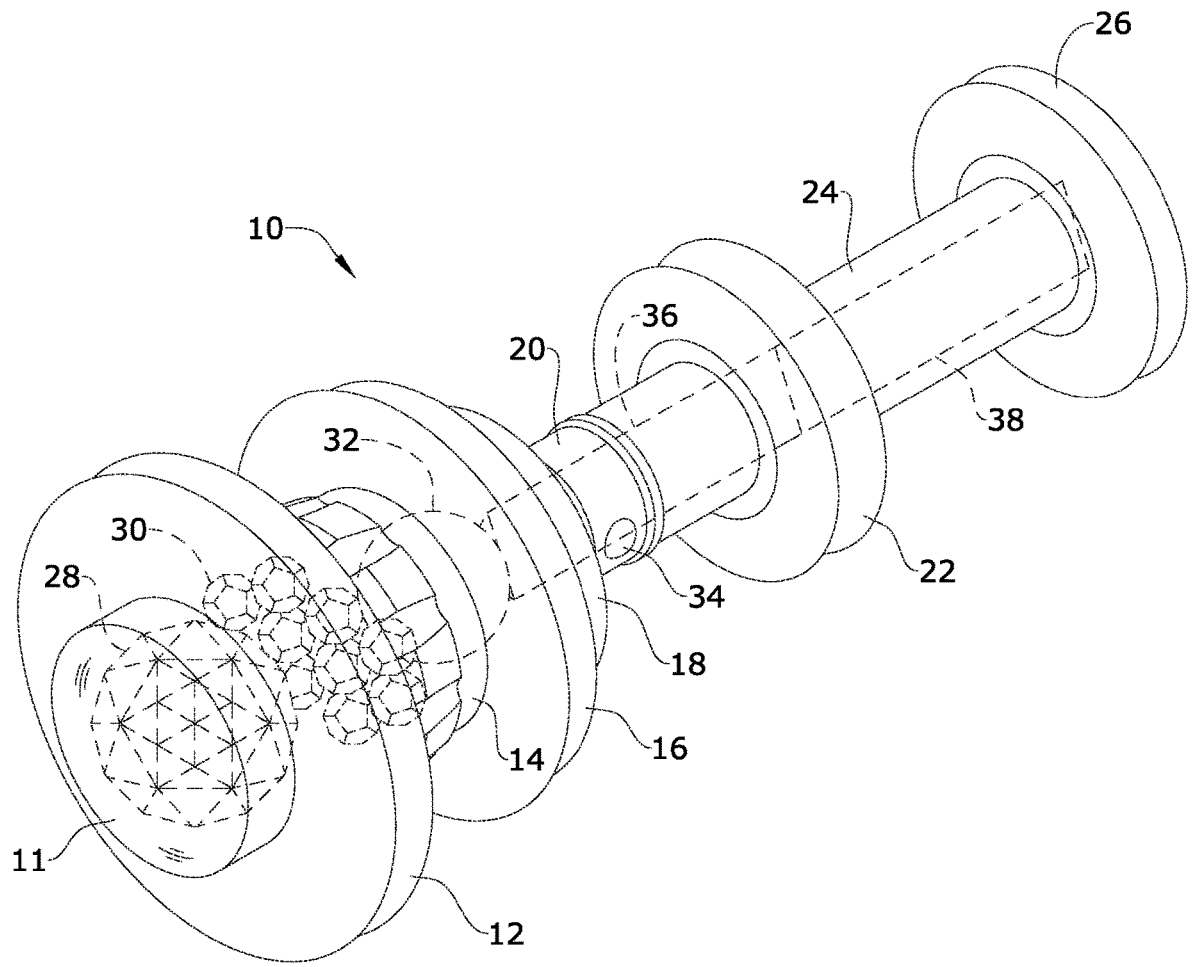
FIG. 1 is a perspective view of an exemplary embodiment of the present invention, using phantom lines to illustrate internal components.
Figure 2:
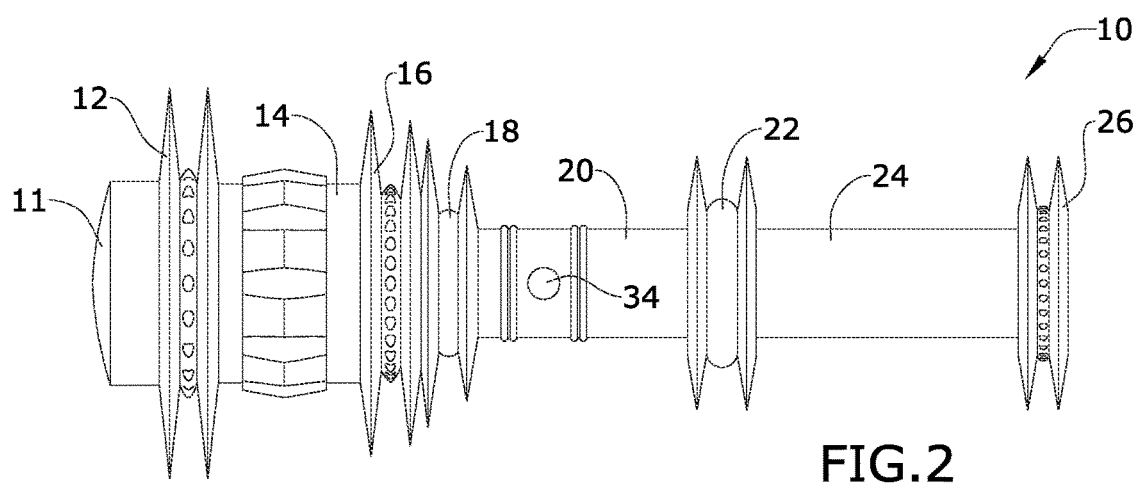
FIG. 2 is a side elevation view of an exemplary embodiment of the present invention.
Figure 3:
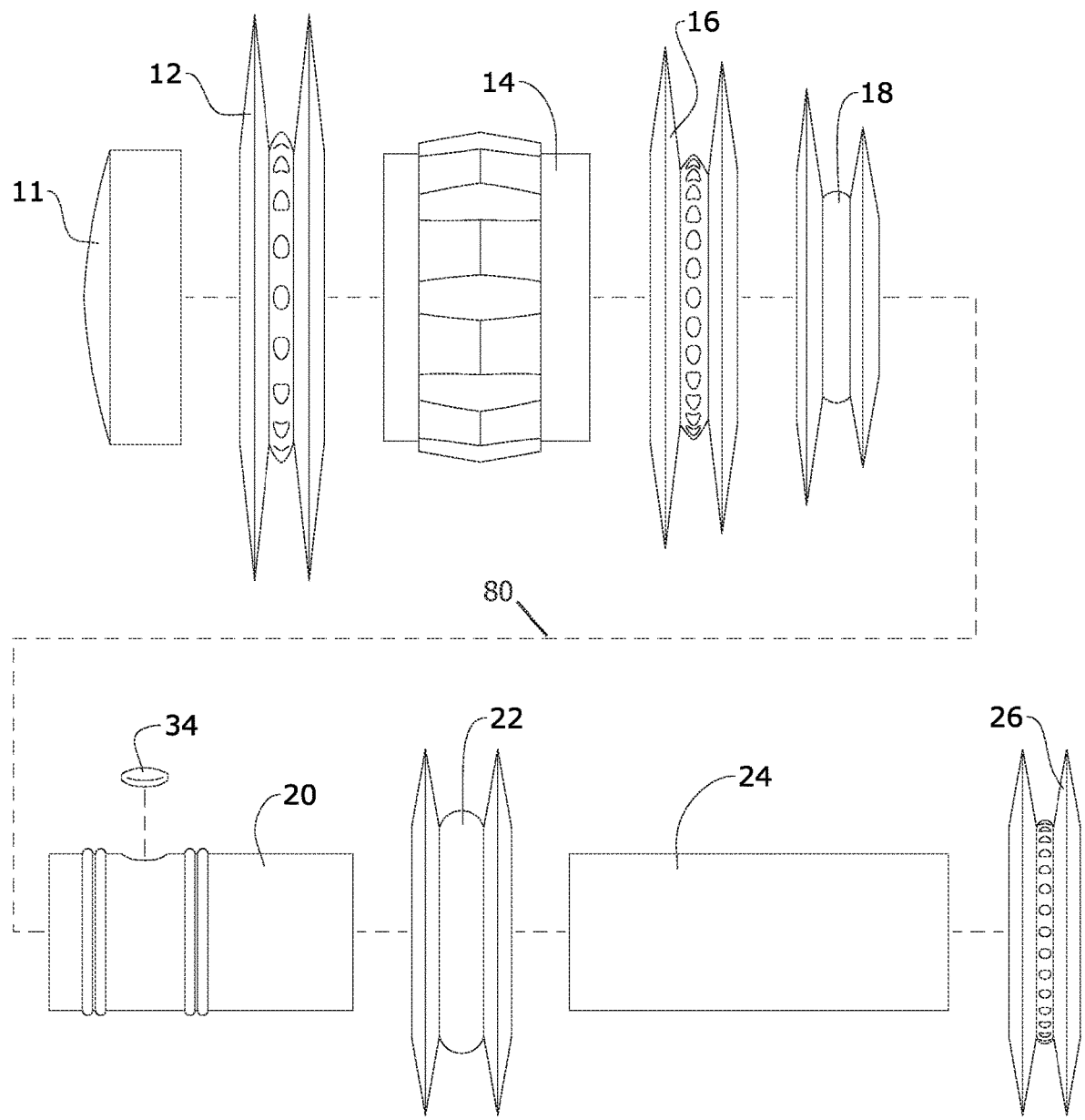
FIG. 3 is an exploded elevation view of an exemplary embodiment of the present invention.
Figure 4:
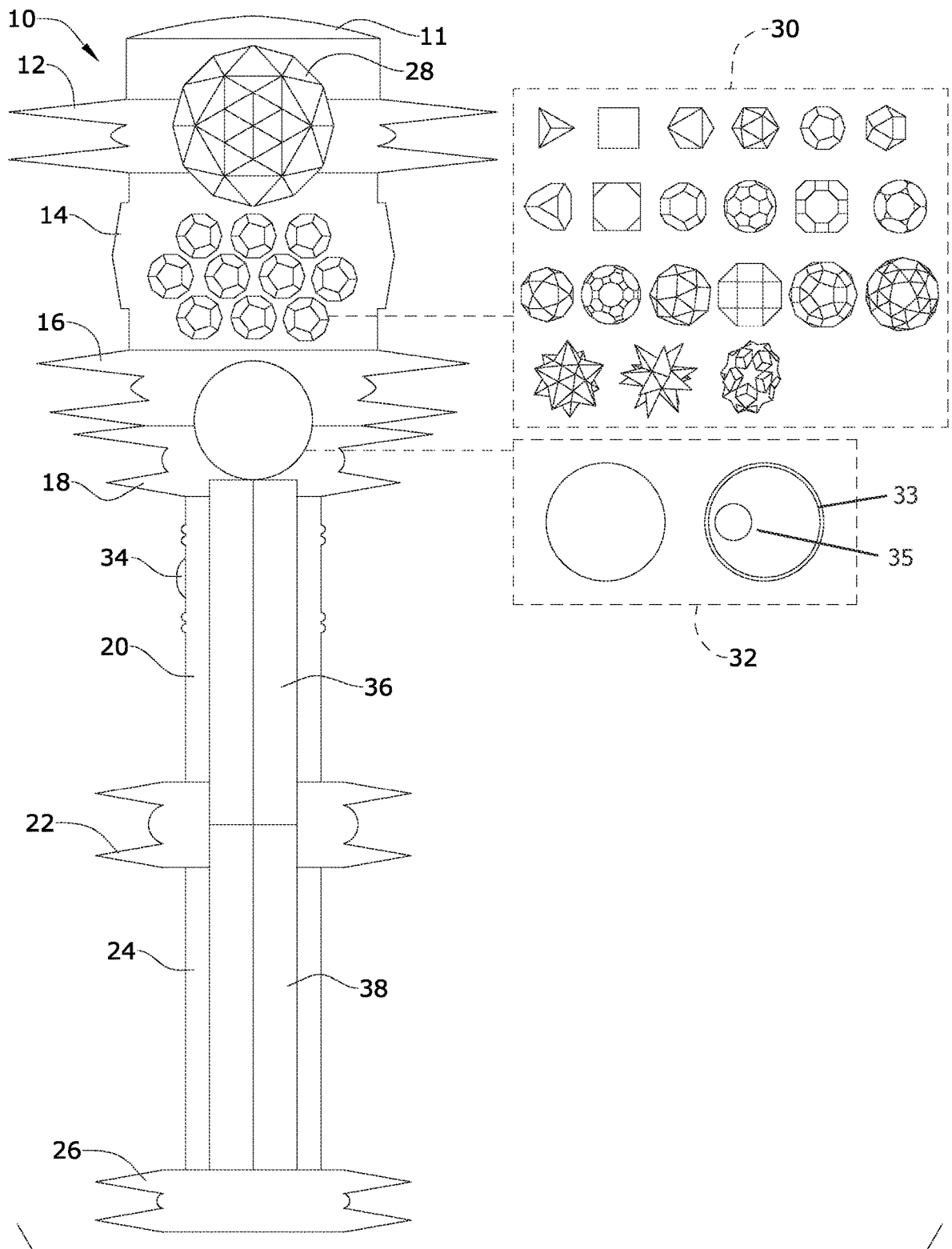
FIG. 4 is a top plan view of an exemplary embodiment of the present invention.
Figure 5:
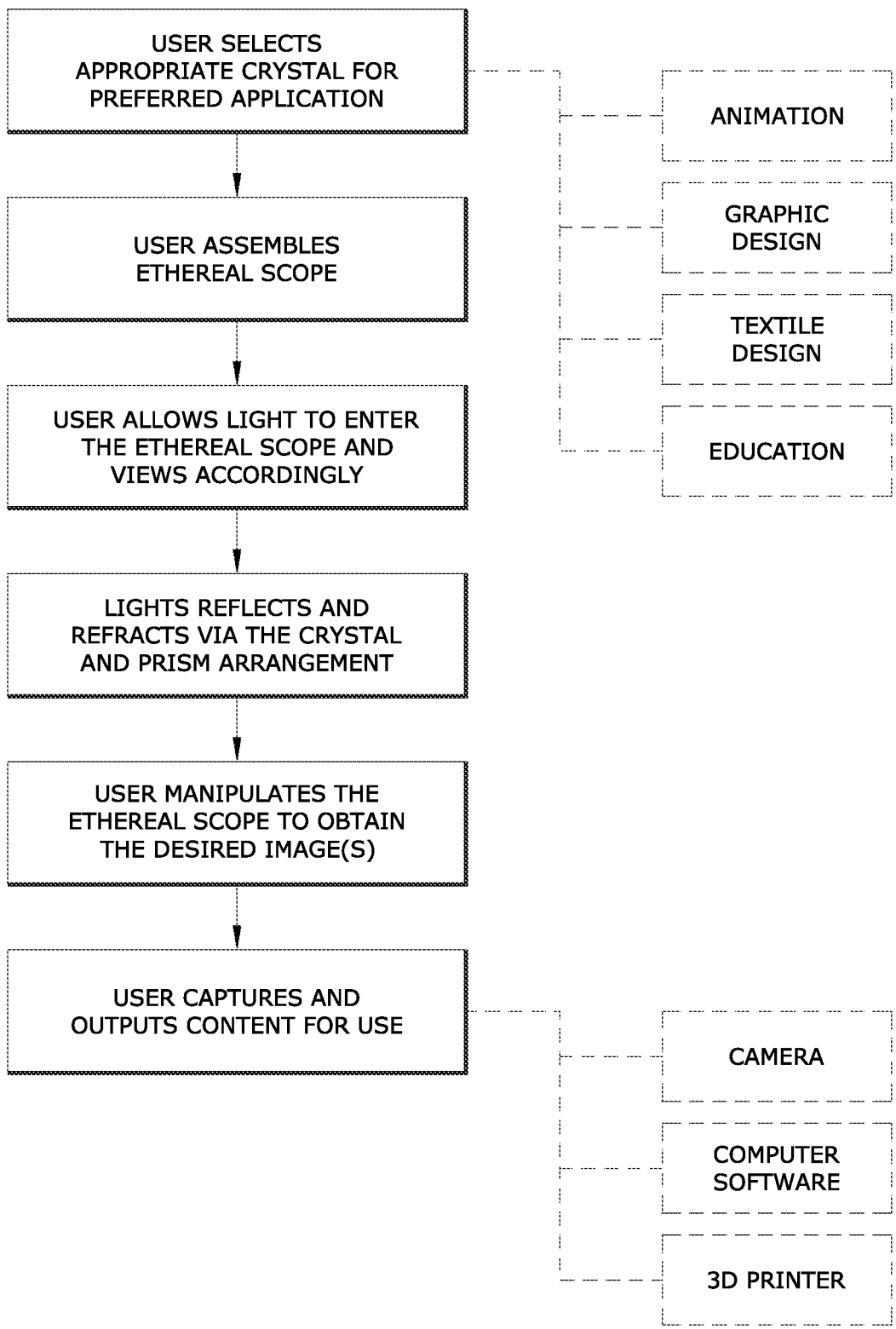
FIG. 5 is a flow chart of an exemplary embodiment of the present invention.

Referring now to FIGS. 1 through 5, the present invention may include an optical instrument 10. On one end of the optical instrument 10 is a lens 11, while on the opposing end of the optical instrument 10 is an eyepiece 26 through which light, that has first passed through the lens 11, is visible. Coupled to the lens 11 is a first fixed link 12. Operatively associated with the first fixed link 12 is a crystal chamber 14, which is sandwiched to the first fixed link 12 by way of a second fixed link 16. Coupled to the second fixed link 16 is a first rotatable link 18 sequentially followed by a first tube 20 and a second rotatable link 22 sequentially followed by a second tube 24 that extends to the eyepiece 26. The portions including and between the first fixed link 12 and the first rotatable link 18 may be referred to as the crystal portion. The portions including and between the second fixed link 16 and the eyepiece 26 may be referred to as the prism portion.

The Crystal Portion

The first fixed link 12 secures a centrally disposed multifaceted crystal prism 28 positioned to intersect a path of the light entering the lens 11.

The crystal chamber 14 dimensioned and adapted to house a plurality of basic crystal geometries 30. Each of the basic crystal geometries 30 may be selectively removed or added variations to the crystal chamber 14 to alter the end results discussed herein. More of the various configurations of crystal geometries 30 is provided below. In some embodiments the crystal geometries 30 are transparent and transmissive of light beams (as wall as other electromagnetic waves) by which such beams refract as a function of the respective geometry crystal geometries 30. In other embodiments, some of the crystal geometries 30 may be reflective, reflecting light as a function of the respective geometry of the crystal geometry 30.

Coupled to the second fixed link 16 and the first rotatable link 18 is disposed a selectively chosen transparent sphere 32. The first rotatable link 18 may be rotated about a longitudinal axis 80 illustrated in FIG. 3. This rotation is relative to the second fixed link 16 which is not rotatable. Said rotation may have two functions: first, allowing the user to replace one crystal sphere 32 with another; and second, rotatable move the selected crystal sphere 32 or transparent spheroid 33 relative the longitudinal axis 80. Since in certain embodiments the transparent spheroid 33 may have an imperfection 35 (relative to a perfect sphere—i.e., a concavity, a planarity, or a protrusion) integrated thereto. In one embodiment, the transparent spheroid 33 imperfection that is a planar surface along an exterior surface thereof to, wherein the planar surface is adapted to create a spherical illusion or fisheye effect. In another embodiment, the imperfection 35 may be a rough cut resin surface serving to recreate the illusion of nonlinear infrastructures simulating irregular organic shapes.

The Prism Portion

Along an interior of the first tube 20 may be a mirrored prism 36. Along an outer surface of the first tube 20 may be disposed an optional, aesthetic amazonite stone 34. Along an interior of the second tube 24 may be a glass prism 38. The optical instrument's arrangement of a glass prism juxtaposed to the mirror prism, wherein the mirror prism 36 is equal in perimeter as the glass prism 38. In certain embodiments, the second rotatable link 22 is sandwiched around the mirror and crystal prisms, whereby enables media housed in each tube 20 and 24 to have individual rotation of the triangular axis of the prism that may or may not align and facilitate the generation of unique, complex geometries to fill in the projections inside the tubular space.

The first rotatable link 18 may rotated the mirrored surfaces of the mirrored prism 36, wherein the second rotatable link 22 may rotate the glass prism 38, about the longitudinal axis 80 so that passing light is changeably refracting reflected and refracted incoming light beams preceding from the eyepiece 26.

Certain Embodiments

Though it is understood the relative dimensions may vary significantly from the specific embodiments disclosed below and still be considered within the scope of the disclosure.

In certain embodiments, the first tube 20 (housing the mirror prism 36) may have an outer diameter of approximately four cm (1½") and an inner diameter of approximately three cm (1¼"), a length of 18 cm (7").

In certain embodiments, the second tube 24 (housing the crystal prism 38) may have an outer diameter of approximately four cm (1½") and an inner diameter of approximately three cm (1¼"), and a length of 18 cm (7").

In certain embodiments, the crystal chamber 14 may have an internal diameter of approximately eight cm (3"), an outer diameter of approximately 8.25 cm (3¼"), and approximately nine cm (3½") long, having in the external central area, a decorative rectilinear pattern on high relief. In certain embodiments, the lens 11 may have a diameter of approximately 7.6 cm (3"), mounted on a copper ring with a corrugated surface and a cap depth of approximately two cm (¾")

Each fixed link 12 and 16 may include two outer rings having a diameter of approximately one and a half times greater than the diameter of an intermediate ring. The multifaceted crystal prism 28 may have a diameter of approximately thirteen cm (5¼").

Each volumetric solid 30 may be a total of 21 crystals having a diameter or perimetrical distance of approximately one cm (½") and the volumetric solid 30 may be one of, but is not limited to, the following groups: 5 platonic solids, 13 Archimedean solids 2 stellated Kepler polyhedra and 1 nonconvex polyhedra. The 5 platonic solids are the only possible variations of convex volumes with regular faces, and equal interior angles, as the foundation of geometric forms that conform all volumetric forms found in 3 dimensional structures. The genesis of cosmic volumes was established by Plato's metaphor of planar geometric solids, and the harmonic interaction of these figures, each associated with one of the 5 elements in the physical universe, and each carrying the formula that will establish the progression of the structural patterns extend interwoven between realms. 1 The tetrahedron is the most fundamental and simple of the regular solids composed of 4 faces: 6 edges: 4 vertices, is associated with the element of fire 2. The octahedron made from 8 equilateral triangles (faces), 12 edges and 6 vertices ascribed to the element of Air. 3. The Icosahedron is composed of 20 equilateral triangular faces, 30 edges and 12 vertices Plato associated it with the element water. 4. The cubic 6 faces, 12 edges and 8 vertices constitute this volume, assigned to the element of Earth. 5. The dodecahedron has 12 regular pentagonal faces, 30 edges and 20 vertices and it's ascribed by Plato as the quintessence of the natural universe relating to the element of Aether (prana). Thirteen Archimedean solids 30 are semi-regular polyhedra, with a high degree of symmetry, belonging two infinite sets of regular prisms and anti-prisms, composed of two or more types of face shapes and all equal vertices, such as the following: truncated tetrahedron, 8 faces 4 triangular and 4 hexagonal, 18 edges, 12 vertices; a cuboctahedron has 14 faces 24 edges, 12 vertices combine 6 square faces of the cube with the 8 triangular faces; a truncated cube formed of eight triangles and six octagons for total of 14 faces, 24 vertices, and 36 edges; truncated octahedron is composed of six squares and eight hexagons for a total of 14 faces, 24 vertices, and 36 edges. 30. truncated icosahedron has 12 regular pentagonal faces and 20 regular hexagonal faces for a total of 32 faces. there are 60 vertices and 90 edges. 30; a great rhombicuboctahedron composed of 12 squares, eight hexagons, and six octagons, for a total of 26 faces, 48 vertices and 72 edges; a truncated dodecahedron (20 triangles and 12 decagons), 32 total faces. there are vertices and 90 edges; an icosidodecahedron composed of 20 triangles 12 pentagons for a total of 32 faces 60 vertices and 30 edges; a great rhombicosidodecahedron 30 squares, 20 hexagons, and 12 decagons, it also has 120 vertices and 180 edges. 30. the snub cube has 38 faces out of which 32 are equilateral triangles and six square faces, 24 vertices and 60 edges; a rhombicuboctahedron made of 8 equilateral triangle faces and 18 square faces. total of 26 faces, 24 vertices and 48 edges; a rhombicosidodecahedron is made of 20 equilateral triangles, 30 squares, and 12 regular pentagons. these polygons create a total of 62 faces. 60 vertices and 120 edges; and a snub dodecahedron is formed out of 80 equilateral triangles and 12 regular pentagons for a total of 92 faces, 60 vertices and 150 edges.

Kepler polyhedra stellation is a process in which the sides of some polygons are extended until they meet again, either by the face planes or by the edges, both the Great Stellated dodecahedron and the Stellated dodecahedron are regarded as non-convex regular polyhedra presenting icosahedral symmetry. The stellated dodecahedron, 12 pentagram faces 12 vertices and 30 edges. Five faces meet in each vertex. The great stellated dodecahedron has 12 faces (pentagrams), 20 vertices and 30 edges. Three faces meet in each vertex. The rectification of the great dodecahedron is called 30 a dodecadodecahedral, which is a uniform star polyhedron with 24 faces, 60 edges and 30 vertices.

The novel arrangement of the optical instrument 10 receives the incoming light passing therethrough from the frontal lens 11 into the multifaceted crystal prism 28 where the light is absorbed, dispersed, refracted, and reflected into multiple beams emanating from each one of the angles vertices until the traveling light beam encounters the next transmissive surface to reflect on or refract through. The continuum spectra carry the light into the multifaceted crystal prism 28, reflects the light it within itself to then travel into the overlapping geometric solids 30 that will continue to reflect, refract and disperse as continuous spectra bridging the light into the crystal chamber 14 encountering the surfaces of the geometric solids 30 (and combinations thereof) roam free of motion above the multifaceted prism ball and below the transparent sphere 32.

A method of using the present invention may include the following. The optical instrument 10 disclosed above may be provided. The viewer observes by way of the eyepiece 26, like a kaleidoscope, of the animation and representation of shapes caused by light passing through the lens 11 and interacting with the multifaceted crystal prism 28, then with one or more of the 21 geometric solids 30, and then with one of two transparent spheres 32 (spheroids 33), that create the fisheye or spherical three-dimensional effect, then the wavelengths are reflected and refracted by way of the mirrored prism 36 and the glass prism 38. As a result, the inventor contends that the optical instrument 10 allows a range of movement for the geometric solids 30 to create innumerable unique images viewable through the eyepiece 26.

As a pedagogical tool can be useful in the learning of the fundamental branches of geometry 30, through which a user can selectively place 1-10 simultaneously in the interior of the crystal chamber 14, enable the visibility of their derivate forms by way of the eyepiece 26. As a creative tool, with the use of a cellphone camera through the eyepiece 26, a user may capture images and videos that can then be applied to create in multiple art and design styles. The optical instrument 10 may be dimensioned and adapted to be biorhythm compatible (for example, compatible with nano leaf LED quantum lights for Synesthesia, wherein each crystal solid 30 relates to a color and a frequency, and wherein the use of biorhythm nano leaf LED quantum lights in the background are key for color cycling and the relation of form and sound and the effects of matter through vibration.

The inventor contends the present invention enables learning of and inspiration by geometry, it's relationship between reality and cognitive processes, as an emerging language. and the study of hidden dimensions such as Hausdorff, fractal geometry, chapters of math and science that study patterns in nature, universal order and division of unity. Furthermore, the reproduction of self-similar images throughout nature that sprout from a seed formula carried out throughout the repetition of all components of a whole is represented, including the study of frequency and vibration, effects of color and color cycling on a physical and metaphysical levels, the study of sacred geometry, graphic demonstrations of nonlinear mathematics, Cymatics, the geometry of nature the principles of natural order and their mathematical demonstration.

As a result, the present invention has applicability in the fields of entertainment, arts, graphic design, lighting industry, textile industry, clothing, upholstery, screen savers, computer graphics, digital media, video production, photography, and architecture.

As used in this application, the term "about" or "approximately" refers to a range of values within plus or minus 10% of the specified number. And the term "substantially" refers to up to 90% or more of an entirety. Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "up," "down," and the like, are words of convenience and are not to be construed as limiting terms unless specifically stated to the contrary.

It should be understood, of course, that the foregoing relates to exemplary embodiments of the invention and that modifications may be made without departing from the spirit and scope of the invention as set forth in the following claims.

What is claimed is:

1. An optical instrument kit comprising:
   an optical instrument, and
   a plurality of crystal geometries selected from the group consisting of five Platonic solids, thirteen Archimedean solids, two Kepler stellated polyhedra and a semi regular non-convex polyhedron;
   wherein the optical instrument comprises:
   a light path extending from a first end of the optical instrument to a second opposite end of the optical instrument, the light path being defined sequentially by a light entrance, a crystal portion, a prism portion, and a light exit;
   the crystal portion comprising:
   a crystal chamber dimensioned and configured to selectively and removably house one or more of the plurality of crystal geometries; and
   a transparent sphere disposed downstream of the light path relative to the crystal chamber above.

2. The optical instrument kit of claim 1, wherein the transparent sphere has a planar surface along a portion thereof.

3. The optical instrument kit of claim 1, wherein the transparent sphere includes an irregular protrusion.

4. The optical instrument kit of claim 1, wherein the transparent sphere includes a rough-cut resin surface.

5. The optical instrument kit of claim 1, further comprising a multifaceted crystal prism upstream of the crystal chamber.

6. The optical instrument kit of claim 5, wherein the multifaceted crystal prism upstream has a diameter of approximately thirteen centimeters.

7. The optical instrument kit of claim 1, wherein the prism portion comprises:
   an interior mirror surface triangular prism; and
   an interior glass surface triangular prism.

8. The optical instrument of kit claim 7, wherein the interior mirror and glass surface triangular prisms are independently rotatable relative to a longitudinal axis of the prism portion.

9. The optical instrument kit of claim 8, further comprising a rotatable link operatively associated to each of the interior mirror and glass surface prisms.

10. The optical instrument kit of claim 9, further comprising a lens upstream of the crystal portion; and an eyepiece downstream of the prism portion.

11. The optical instrument kit of claim 10, wherein the transparent sphere is rotatable relative to a longitudinal axis of the prism portion.

12. The optical instrument kit of claim 1, wherein the plurality of crystal geometries is optically transmissive.

13. The optical instrument kit of claim 1, wherein one or more of the plurality of crystal geometries are reflective.

14. An optical instrument, comprising:
a light path extending from a first end of the optical instrument to a second opposite end of the optical instrument, the light path being defined sequentially by a light entrance, a crystal portion, and a prism portion, and a light exit;
the crystal portion comprising:
a crystal chamber dimensioned and configured to selectively and removably house one or more of a plurality of crystal geometries; and
a transparent sphere disposed downstream of the light path relative to the crystal chamber above,
the transparent sphere including one of an irregular protrusion or a rough-cut resin surface.

15. An optical instrument, comprising:
a light path extending from a first end of the optical instrument to a second opposite end of the optical instrument, the light path being defined sequentially by a light entrance, a crystal portion, and a prism portion, and a light exit;
the crystal portion comprising:
a crystal chamber dimensioned and configured to selectively and removably house one or more of a plurality of crystal geometries; and
a transparent sphere disposed downstream of the light path relative to the crystal chamber above; and
the prism portion comprising: an interior mirror surface triangular prism; and an interior glass surface triangular prism.

* * * * *